No. 880,579. PATENTED MAR. 3, 1908.
P. SCHOOP.
CARBON ELECTRODE FOR ELECTRICAL BLEACHING APPARATUS.
APPLICATION FILED NOV. 26, 1906.
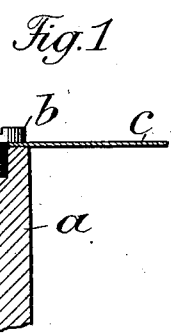
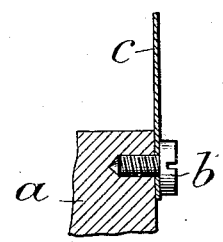
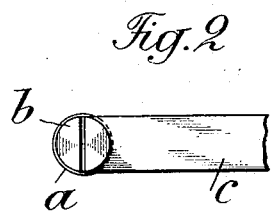
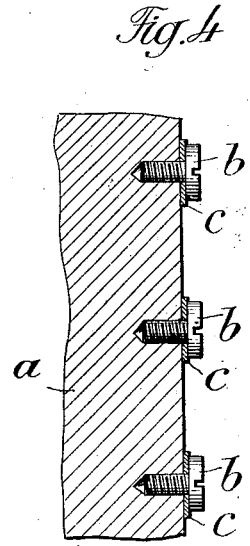
Witnesses:
Jesse N. Lutton.
R. W. Helff
Inventor:
Paul Schoop
by Henry Orth Jr.
Atty

UNITED STATES PATENT OFFICE.

PAUL SCHOOP, OF NUREMBERG, GERMANY.

CARBON ELECTRODE FOR ELECTRICAL BLEACHING APPARATUS.

No. 880,579.　　　Specification of Letters Patent.　　　Patented March 3, 1908.

Application filed November 26, 1906. Serial No. 345,219.

*To all whom it may concern:*

Be it known that I, PAUL SCHOOP, a citizen of the Republic of Switzerland, residing at Nuremberg, Germany, have invented certain new and useful Improvements in or Relating to Carbon Electrodes for Electrical Bleaching Apparatus; and I do hereby declare the following to be a full, clear, and exact description of the invention, such as will enable others skilled in the art to which it appertains to make and use the same.

The carbon electrodes used in electrolysis, especially that of salt solutions, have to be brought into unvarying metallically conducting contact. The metal yoke-shaped conducting strips used in galvanic elements are not well adapted for this purpose, because common metals such as copper, bronze, brass etc. readily get covered in course of time with a layer of oxid which impairs the originally good contact. On the other hand the high cost price is a practical obstacle in the way of employing yokes made of silver, platinum or other precious metals.

The present invention has for its object to produce with a minimum consumption of precious metal a contact that shall be capable of resisting the corroding influences to which it is exposed and therefore of remaining permanently efficient. With this object in view a series of holes are made in the carbon electrodes at a part thereof as remote as possible from the electrolytic liquid and these holes are formed with a screw thread. The conducting strips of silver, platinum or similar precious metals may be very thin and have corresponding holes made in them through which are passed screws made of carbon which exactly fit the thread in the electrodes. By tightening up the screws the precious metal is pressed firmly against the electrode and a lasting and unvarying contact is thereby produced.

Referring to the drawings, in which like parts are similarly designated—Figure 1 is a section, and Fig. 2 a plan view of a small electrode having a metal strip connected thereto. Fig. 3 is a vertical section, and Fig. 4 a horizontal section of a carbon electrode having a plurality of leads connected thereto.

The carbon electrode $a$ has one or more threaded holes made therein into which fit carbon screws $b$ that clamp the platinum or other precious metal lead $c$ between the electrode $a$ and the head of the screw $b$, always maintaining close contact.

Having now particularly described and ascertained the nature of the said invention and in what manner the same is to be performed I declare that what I claim is:

In a contact for carbon electrodes of electrolytic apparatus, the combination with the electrode having a threaded hole formed therein, of a perforated precious metal lead and a hard carbon screw passed through the perforation in the lead and screwed into the electrode.

In testimony that I claim the foregoing as my invention, I have signed my name in presence of two subscribing witnesses.

PAUL SCHOOP.

Witnesses:
　LOUIS MUELLER,
　MATHILDE K. HELD.